(12) United States Patent
Latotzki et al.

(10) Patent No.: US 10,496,090 B2
(45) Date of Patent: Dec. 3, 2019

(54) HANDOVER PROCEDURE FOR DRIVER OF AUTONOMOUS VEHICLE

(71) Applicant: MAGNA ELECTRONICS INC., Auburn Hills, MI (US)

(72) Inventors: Ralph Latotzki, Hamburg (DE); Frank Goseberg, Aschaffenburg (DE)

(73) Assignee: MAGNA ELECTRONICS INC., Auburn Hills, MI (US)

( * ) Notice: Subject to any disclaimer, the term of this patent is extended or adjusted under 35 U.S.C. 154(b) by 154 days.

(21) Appl. No.: 15/716,718

(22) Filed: Sep. 27, 2017

(65) Prior Publication Data

US 2018/0088574 A1    Mar. 29, 2018

Related U.S. Application Data

(60) Provisional application No. 62/401,310, filed on Sep. 29, 2016.

(51) Int. Cl.
| | | |
|---|---|---|
| *G05D 1/00* | (2006.01) | |
| *G05D 1/02* | (2006.01) | |
| *B60W 30/095* | (2012.01) | |

(52) U.S. Cl.
CPC ......... *G05D 1/0061* (2013.01); *B60W 30/095* (2013.01); *G05D 1/0246* (2013.01); *G05D 1/0251* (2013.01); *B60G 2400/823* (2013.01); *G05D 2201/0213* (2013.01)

(58) Field of Classification Search
CPC .............................. G05D 1/0061; G05D 1/00
See application file for complete search history.

(56) References Cited

U.S. PATENT DOCUMENTS

| | | | |
|---|---|---|---|
| 6,690,268 B2 | 2/2004 | Schofield et al. | |
| 6,693,517 B2 | 2/2004 | McCarthy et al. | |
| 7,580,795 B2 | 8/2009 | McCarthy et al. | |
| 8,618,922 B2 * | 12/2013 | Debouk | B60W 50/038 340/439 |
| 9,235,211 B2 * | 1/2016 | Davidsson | B60W 50/14 |
| 9,499,139 B2 * | 11/2016 | Koravadi | B60T 7/12 |
| 9,729,636 B2 * | 8/2017 | Koravadi | G01C 21/3415 |
| 9,884,631 B2 * | 2/2018 | James | B60W 50/082 |
| 9,911,050 B2 * | 3/2018 | Lynam | B60Q 9/005 |
| 10,032,369 B2 * | 7/2018 | Koravadi | G08G 1/0141 |
| 10,051,061 B2 * | 8/2018 | Koravadi | G01C 21/3415 |

(Continued)

*Primary Examiner* — Hussein Elchanti
*Assistant Examiner* — Michael A Berns
(74) *Attorney, Agent, or Firm* — Honigman LLP

(57) ABSTRACT

A control system that is operable to control a vehicle in an autonomous or semi-autonomous mode includes a processor that processes data captured by a plurality of exterior sensing sensors. When the control system is operating in the autonomous or semi-autonomous mode and responsive to a determination of an upcoming event that requires the system to hand over control of the vehicle to a driver before the vehicle encounters the event, the control determines (i) a total action time until the vehicle encounters the event, (ii) an estimated time for the driver to take over control and (iii) an estimated handling time for the vehicle to be controlled before the vehicle encounters the event. Responsive to the determinations, the control system (i) allows the driver to take over control of the vehicle or (ii) controls the vehicle to slow down and stop the vehicle before the vehicle encounters the event.

20 Claims, 7 Drawing Sheets

(56) References Cited

U.S. PATENT DOCUMENTS

| | | | |
|---|---|---|---|
| 10,137,892 B2* | 11/2018 | Koravadi | B60T 7/12 |
| 10,144,419 B2* | 12/2018 | Viehmann | B60W 30/09 |
| 10,222,224 B2* | 3/2019 | Johnson | G08G 1/143 |
| 10,261,514 B2* | 4/2019 | Zych | G08G 1/165 |
| 2012/0062743 A1 | 3/2012 | Lynam et al. | |
| 2012/0218412 A1 | 8/2012 | Dellantoni et al. | |
| 2013/0222592 A1 | 8/2013 | Gieseke | |
| 2014/0218529 A1 | 8/2014 | Mahmoud et al. | |
| 2014/0375476 A1 | 12/2014 | Johnson et al. | |
| 2015/0070160 A1* | 3/2015 | Davidsson | B60W 50/14 340/457 |
| 2015/0124096 A1 | 5/2015 | Koravadi | |
| 2015/0158499 A1 | 6/2015 | Koravadi | |
| 2015/0251599 A1 | 9/2015 | Koravadi | |
| 2015/0352953 A1 | 12/2015 | Koravadi | |
| 2016/0036917 A1 | 2/2016 | Koravadi et al. | |
| 2016/0210853 A1 | 7/2016 | Koravadi | |
| 2017/0144658 A1 | 5/2017 | Viehmann | |
| 2017/0274906 A1 | 9/2017 | Hassan et al. | |
| 2017/0277182 A1 | 9/2017 | May et al. | |
| 2017/0329331 A1 | 11/2017 | Gao | |
| 2017/0329346 A1 | 11/2017 | Latotzki | |
| 2017/0364070 A1* | 12/2017 | Oba | B60W 50/08 |
| 2018/0088574 A1 | 3/2018 | Latotzki et al. | |
| 2018/0203451 A1* | 7/2018 | Cronin | G05D 1/0212 |
| 2018/0339714 A1 | 11/2018 | Smid et al. | |

* cited by examiner

HANDOVER PROCEDURE FOR DRIVER OF AUTONOMOUS VEHICLE

CROSS REFERENCE TO RELATED APPLICATION

The present application claims the filing benefits of U.S. provisional application Ser. No. 62/401,310, filed Sep. 29, 2016, which is hereby incorporated herein by reference in its entirety.

FIELD OF THE INVENTION

The present invention relates generally to a vehicle vision system for a vehicle and, more particularly, to a vehicle vision system that utilizes one or more cameras at a vehicle.

BACKGROUND OF THE INVENTION

Use of imaging sensors in vehicle imaging systems is common and known. Examples of such known systems are described in U.S. Pat. Nos. 5,949,331; 5,670,935 and/or 5,550,677, which are hereby incorporated herein by reference in their entireties.

SUMMARY OF THE INVENTION

The present invention provides a driver assistance system or control system for a vehicle that provides autonomous or semi-autonomous control of the vehicle, such as responsive to image processing of image data captured by the cameras and processing of sensor data captured by other sensors of the vehicle, such as radar sensors or the like. The system is operable to determine when an occupant or driver of the vehicle should take over control of the vehicle (from the autonomous or semi-autonomous control mode) (such as responsive to a determination of a hazardous driving condition or a determination of a fault or defect or error with the autonomous or semi-autonomous control of the vehicle) and determines or estimates how long it will take the driver to take over control of the vehicle and, responsive to the determinations and to the type of situation requiring the driver to take over, the system may continue to control the vehicle to avoid a hazard or to slow down or stop the vehicle until the driver is ready to take over control of the vehicle. The system continues to control the vehicle or releases control to the driver depending on (i) how much time the system determines is available for the driver to safely take over control of the vehicle and to steer or maneuver the vehicle to avoid a hazard or the like, (ii) how much time the system estimates it will take the driver to take over control of the vehicle, and (iii) the maximum takeover time in which the driver can take over control of the vehicle sufficiently prior to the event point.

For example, if the estimated recovery time of the driver is greater than the takeover time, then the system continues to control the vehicle and executes a safe harbor maneuver. If the estimated recovery time of the driver is less than the takeover time, then the system allows the driver to take over control of the vehicle. If the estimated recovery time of the driver is less than the takeover time, but the driver does not take over in time, then the system continues to control the vehicle and executes a safe harbor maneuver.

These and other objects, advantages, purposes and features of the present invention will become apparent upon review of the following specification in conjunction with the drawings.

DEFINITIONS

Action Time—Remaining time before reaching an event that either triggers HDAR or HDIR.

Human Driver Attention Request (HDAR)—The system requests attention from the driver to observe the current driving situation.

Human Driver Intervention Request (HDIR)—The system requests the driver to take over the driving task while in an active state or transition state (this may imply a limited access highway or LAH).

Driver Handling Time—The time that the driver needs to perform necessary maneuver.

Planned Handling Time—The time the system expects a maneuver to take when executed, where this is the larger value of either the driver handling time or the time for a safe harbor maneuver (where it may be unclear whether the driver will take over).

Estimated Recovery Time—Estimated time it takes the driver to take over control of the subject vehicle, which may be determined from driver monitoring, and estimates how long it will take until the driver is mentally and physically ready to perform the next maneuver.

Event Point—An event that cannot be handled by the system, such as, for example, when at x seconds from a given time (or a distance ahead of the vehicle), the vehicle will have a catastrophe if nothing is done (e.g., encounter an object or experience a system failure).

Handover Time—Theoretically available time for handover (the difference between the action time and the planned handling time or safe harbor maneuver time).

Redundancy Undershoot Condition ("Red-Condition")—Functional safety concept is violated due to loss off redundancy caused by technical failure.

Safe Harbor Maneuver Time—The time necessary to execute a maneuver seeking safe harbor.

Driver Take Over Time (at first named Driver Reaction Time)—The time it really takes the driver to take control of the subject vehicle.

DESCRIPTION OF THE PREFERRED EMBODIMENTS

A driver assist system and/or object detection system and/or alert system and/or autonomous vehicle control system operates to capture image data and/or sensor data exterior of the vehicle and may process the captured image data to display images and to detect objects at or near the vehicle and in the predicted path of the vehicle, such as to control the vehicle in an autonomous or semi-autonomous mode. The system includes a processor that is operable to receive data from one or more cameras and/or other sensors (such as radar sensors or the like) and may detect the path of travel of the vehicle and/or determine the presence of objects in the path of travel of the vehicle and/or may provide an output to a display device for displaying images representative of captured image data. Optionally, the vision system may provide display, such as a rearview display or a top down or bird's eye or surround view display or the like.

Figure 1:
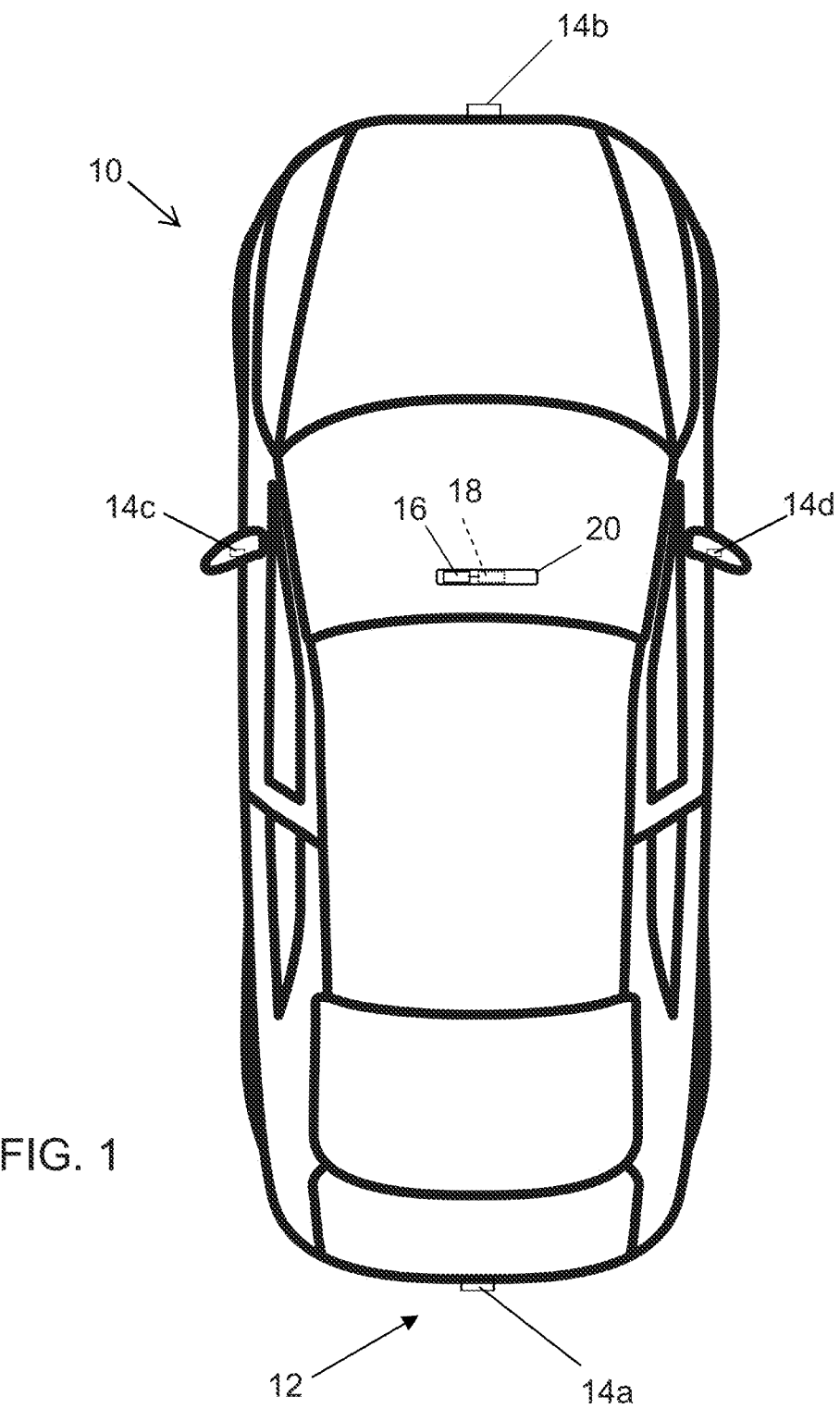
FIG. 1 is a plan view of a vehicle with a vision system that incorporates cameras in accordance with the present invention.

Referring now to the drawings and the illustrative embodiments depicted therein, a vehicle 10 includes a sensing system 12 that includes at least one exterior facing sensor (such as a camera and/or radar sensor and/or the like), such as a rearward facing imaging sensor or camera 14a (and the system may optionally include multiple exterior facing imaging sensors or cameras and/or other sensors, such as a forward facing camera 14b (and/or other sensors) at the front (or at the windshield) of the vehicle, and a sideward/rearward facing camera 14c, 14d (and/or other sensors) at respective sides of the vehicle), which captures image data exterior of the vehicle, with the camera having a lens for focusing images at or onto an imaging array or imaging plane or imager of the camera (FIG. 1). Optionally, a forward viewing camera may be disposed at the windshield of the vehicle and view through the windshield and forward of the vehicle, such as for a machine vision system (such as for traffic sign recognition, headlamp control, pedestrian detection, collision avoidance, lane marker detection and/or the like). The system 12 includes a control or electronic control unit (ECU) or processor 18 that is operable to process data captured by the camera or cameras or sensors and may detect objects or the like and/or provide displayed images at a display device 16 for viewing by the driver of the vehicle (although shown in FIG. 1 as being part of or incorporated in or at an interior rearview mirror assembly 20 of the vehicle, the control and/or the display device may be disposed elsewhere at or in the vehicle). The data transfer or signal communication from the camera to the ECU may comprise any suitable data or communication link, such as a vehicle network bus or the like of the equipped vehicle.

According to SAE Level 3, autonomous vehicles still are not required to handle all driving and emergency tasks which may come up during driving by their own, and due to that, it is still required that the driver may take back the vehicle control. In known commercially available solutions, such as, for example, the Daimler E-Class and Tesla S vehicles, the vehicle is typically requesting the driver to take back control by first actuating the taking over alarms, such as beeping, displaying and vibrating, and then falling into a state at which the vehicle continuously decelerates in case the driver does not take over.

Although the examples are not intended to fulfill Level 3, they comply more or less with SAE level 2. Both systems require that the driver is attentive at all times, every time capable to take back control from the automated driving system. Both of these systems are meant for highway-like (essentially intersection free) roads only (limited access highway (LAH) or closed access highway (CAH)) and both are not capable of guiding the vehicle off the drive lanes as system emergency performance. In an emergency driving condition, there is no redundancy for the driver himself or herself. Systems according to SAE Level 3 instead require that the system is capable to handle dynamic driving tasks but a driver is present as redundancy.

Some commercial systems are nowadays equipped with an e-call system such as Jaguar Land Rover's 'Land Rover Incontrol™'. These systems are able to detect a state of emergency in certain conditions. Especially crash situations get detected (especially the air bag deployment) at which an automated call to an emergency service is triggered by the vehicle automatically. Multi collision braking (MCB) systems such as Volkswagen's 'Volkswagen Multi Collision Brake' are known to brake past a collision detection to mitigate or avoid subsequent collisions. This puts the vehicle in a potentially safer state than to rely on the driver's potential braking interaction, since the driver may be unable to brake. The driver's condition stays typically undetected by these kind of systems. An e-call system with driver health condition detection by processing vehicle inherent and non-vehicle inherent sensor's data is described in U.S. patent application Ser. No. 15/463,293, filed Mar. 20, 2017, and published on Sep. 28, 2017 as U.S. Patent Publication No. US-2017-0274906, which is hereby incorporated herein by reference in its entirety.

For autonomous vehicles suitable for deployment with the system of the present invention, an occupant of the vehicle may, under particular circumstances, be desired or required to take over operation/control of the vehicle and drive the vehicle so as to avoid potential hazard for as long as the autonomous system relinquishes such control or driving. Such occupant of the vehicle thus becomes the driver of the autonomous vehicle. As used herein, the term "driver" refers to such an occupant, even when that occupant is not actually driving the vehicle, but is situated in the vehicle so as to be able to take over control and function as the driver of the vehicle when the vehicle control system hands over control to the occupant or driver or when the vehicle control system is not operating in an autonomous or semi-autonomous mode.

Typically an autonomous vehicle would be equipped with a suite of sensors, including multiple machine vision cameras deployed at the front, sides and rear of the vehicle, multiple radar sensors deployed at the front, sides and rear of the vehicle, and/or multiple lidar sensors deployed at the front, sides and rear of the vehicle. Typically, such an autonomous vehicle will also have wireless two way communication with other vehicles or infrastructure, such as via a car2car (V2V) or car2x communication system.

The present invention provides a system that controls the takeover process where the driver takes over control of an autonomous or semi-autonomous vehicle. For giving the driver the freedom to not being attentive to the road scene while driving in autonomous mode (SAE Level 3 mode), it is the usual approach to hand over the vehicle before a driving task emerges that only a human can handle (commonly referred to as a Human Driver Intervention Request HDIR). The driver has to take over before the driving task emerges unless the system redundancy is lost. Such a task is often referred to as a driver intervention task (DIT). The driver is also the 'fall back' redundancy when an automated driving system function is failing as discussed below. In practice there is the matter that a situation which must be handled by a human may come faster than it takes a human driver to take over (driver recovery DR), where this may be because the driver is distracted or sleeping, or because the HDIR came very fast that the system hand over and the reaction time of a human driver in sum would take too long.

Previously known in automotive is to have driver assistant systems that detect the environmental scene, especially the scene of the path ahead the subject vehicle (SV) or ego vehicle is planning to take. In case of collision hazard events (CHE), such as, for example, when a piece of lost cargo (hazardous object, HO) appears at the lane of the subject vehicle (SV), the systems are able to calculate the time to collision (TTC) when taking the speed (and the HO's static or changing speed is constant) into account and an extended time to collision in case the vehicle assistant system is taking collision mitigating actions such as braking into account. Some systems may be able to also execute collision avoiding steering maneuvers in combination with braking, but this requires a proper scene context understanding, so that the system does not make worse the CHS situation rather than do any good (since the scene detection is not perfect there may be objects such as pedestrians which may have been overlooked by the system and thus may be harmed during the collision mitigation maneuver, while the vehicle is avoiding the HO instead). Because of that, the emergency handling is still left to the human drivers (with the exception of MCB brake actuation past a collision detection).

Figure 2:
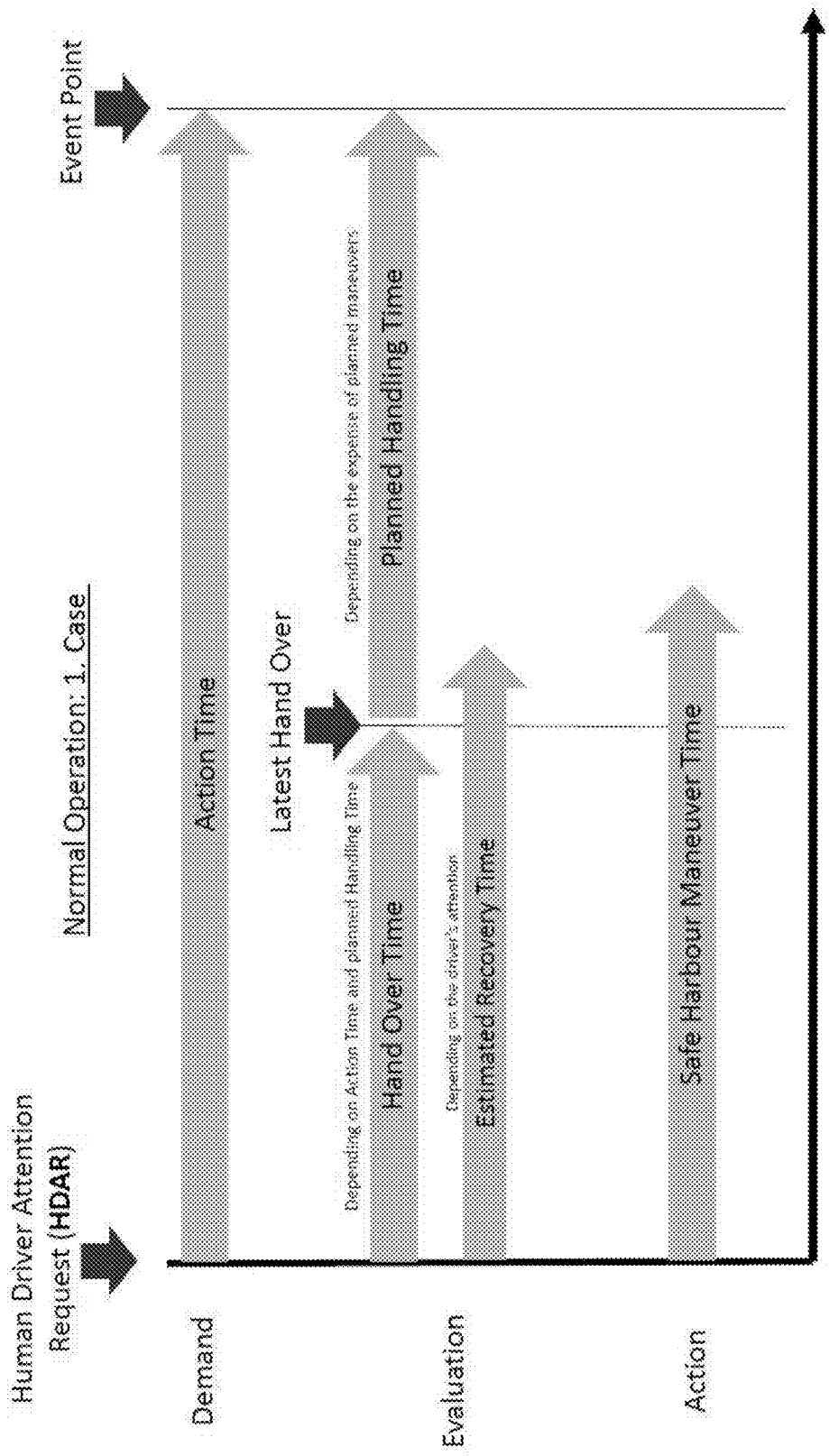
FIG. 2 is a time scheme at which an estimated driver recovery time exceeds the evaluated available time to hand the vehicle control back to the driver (Hand Over Time), such that the vehicle triggers a Safe Harbor Maneuver right from the beginning and not exceeding the Planned Handling Time.
Figure 3:
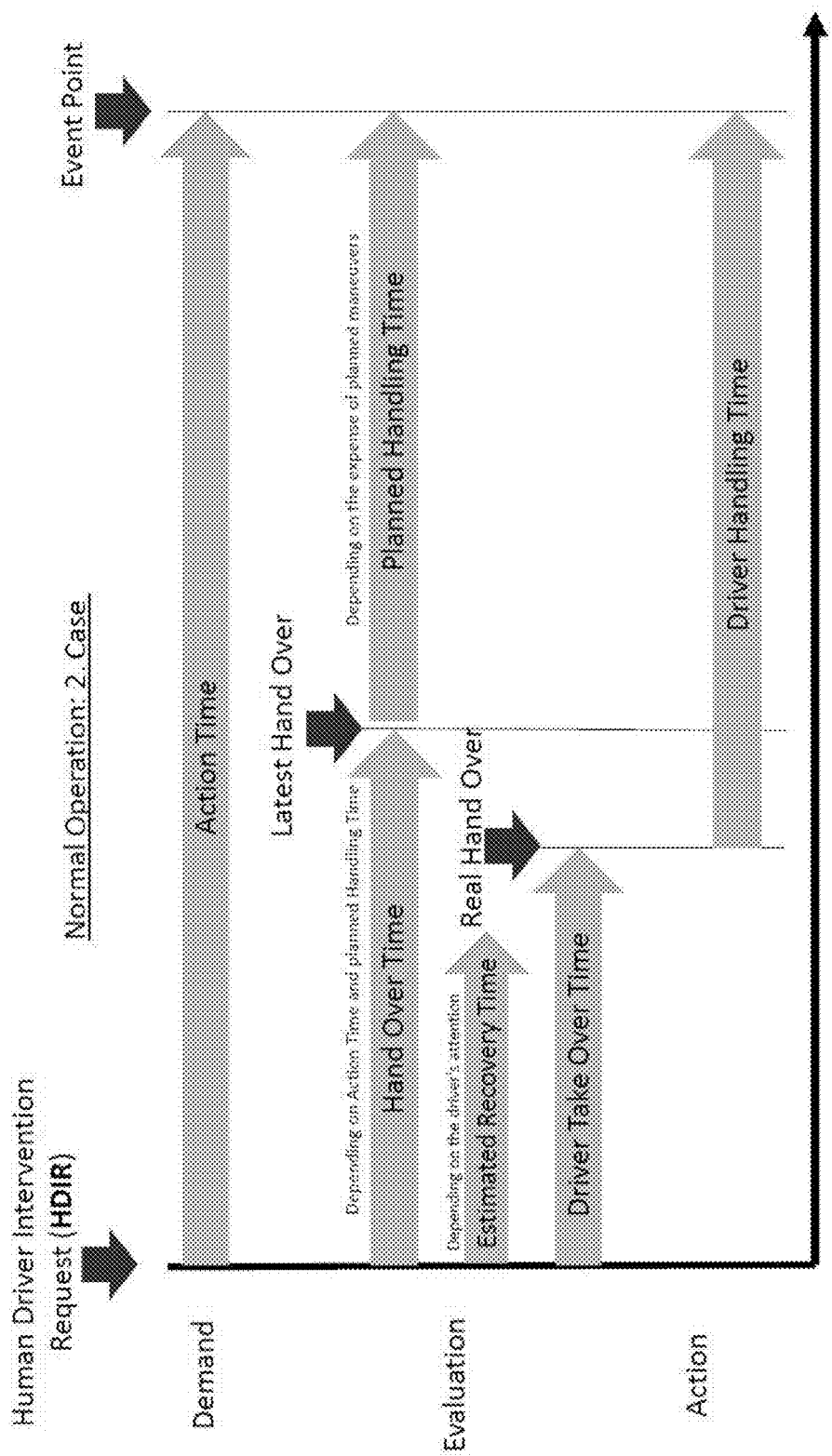
FIG. 3 is a time scheme at which the estimated driver recovery time is less than the evaluated available time to hand the vehicle control back to the driver (Hand Over Time), such that the vehicle does not trigger a Safe Harbor Maneuver (SHM), and because the point of time when the driver actually takes over is earlier than the Latest Hand Over point in time, the system allows the driver to take over control of the vehicle.
Figure 4:
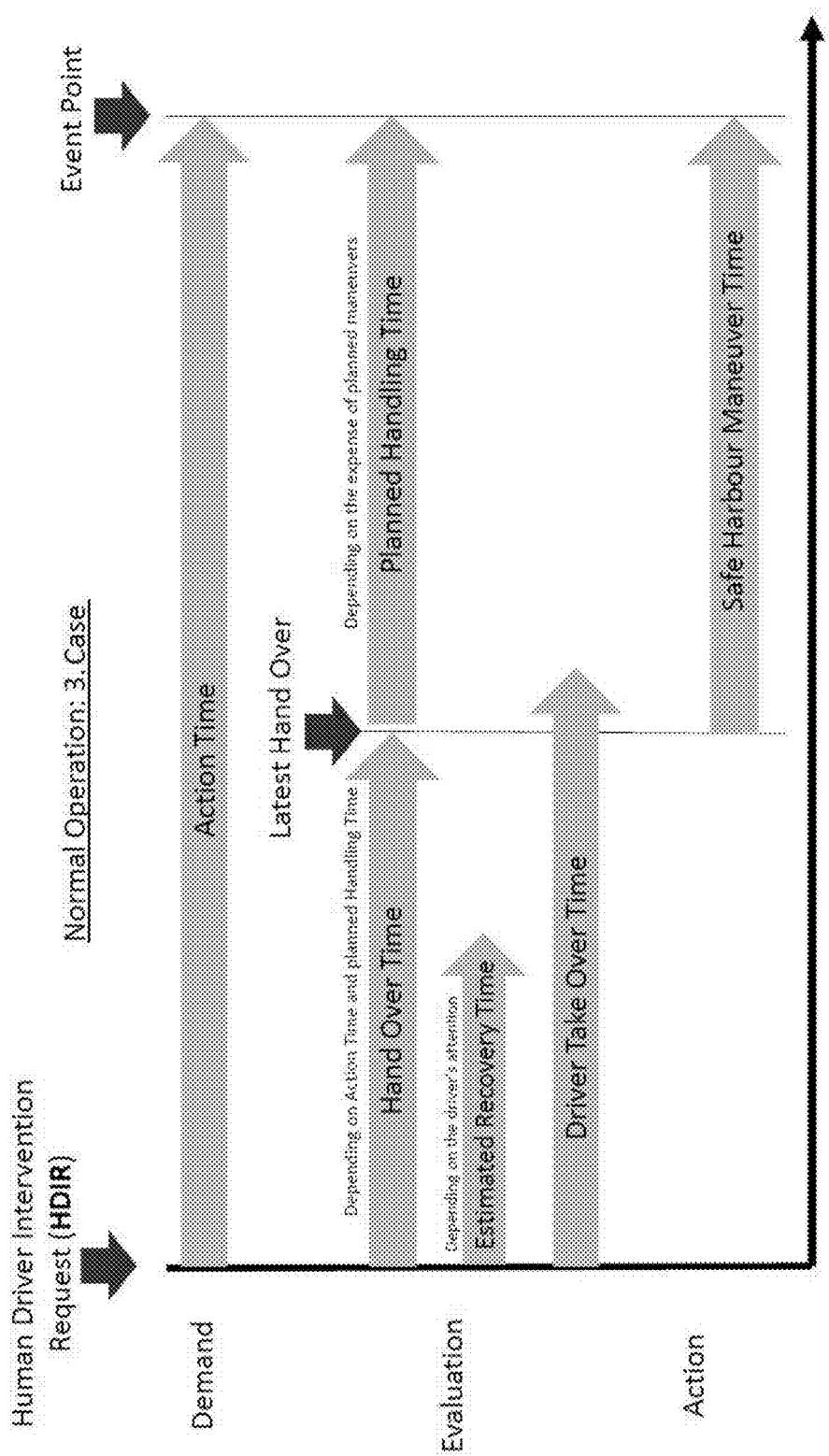
FIG. 4 is a time scheme at which the estimated driver recovery time is less than the evaluated available time to hand the vehicle control back to the driver (Hand Over Time), but since the point of time when the driver really is ready to take over is later than the Latest Hand Over (LHO) point in time, the vehicle initiates a SHM at the LHO, and the SHM takes as long as the Planned Handling Time.

In accordance with an aspect of the system of the present invention, a vehicle with automated driving feature SAE Level 3 may have a subsystem to detect the driver's ability to take over, and is capable to do an estimation of the time it will take the driver to take over control of the vehicle (estimated driver recovery time EDRT), see FIGS. 2, 3 and 4. The system may have in-cabin sensors and optionally the sensing information of smartphones and optionally the sensors of wearables or implants of the driver to monitor whether the driver is attentively driving or which non driving related activities he or she is doing or how far he or she is distracted and optionally which health condition system he or she is in. The estimated hand over time may be picked out of a look up table of previous mass screening results of the typical time the specific non driving activity is taking. Upon the underrun of one or more specific or combined health or distraction parameters, the system may assume the driver is unable to take over (or recover) the vehicle (see case in FIG. 2).

Optionally, there may be health parameters indicating the driver is sleeping. Optionally, the system may have the ability to learn the driver's specific health parameters in a calibration phase or that parameters may be given from elsewhere as specific teaching data set. Optionally, the estimation of the hand over time may depend partially on the driver's age. Optionally, the estimation of the hand over time may depend partially on the driver's sex. Optionally, the estimation of the hand over time may depend partially on the driver's ethnos. Optionally, the estimation of the hand over time may depend partially on how long the driver was already awake continuously. Optionally, the estimation of the hand over time may depend partially on whether the driver has had the possibility to have a nap while he or she was awake. Optionally, the estimation of the hand over time may depend partially on whether the driver has eaten lately. Optionally, the estimation of the hand over time may depend partially on the time of day or night. Optionally, the estimation of the hand over time may depend partially on the date or season or driving/environment conditions. Optionally, the estimation of the hand over time may depend partially on the in cabin climate parameters (AC is on or off, it's cold outside or sunny). Optionally, the estimation of the hand over time may depend partially on the light conditions. Optionally, the estimation of the hand over time may depend partially on the work load or stress [level] the driver may have had in the recent past before or while driving.

Optionally, the estimation of the hand over time may depend partially on the facts whether the driver is driving alone or driving with occupants and whether he or she is in conversation with them. Optionally, the estimation of the hand over time may depend partially on whether the driver is on the phone. Optionally, the estimation of the hand over time may depend partially on whether the driver is texting. Optionally, the estimation of the hand over time may depend partially on whether the driver is eating or drinking. Optionally, the estimation of the hand over time may depend partially on whether the driver is reading. Optionally, other factors may also or otherwise be taken into account for the estimation of the hand over time in case these are detectable and classifiable, such as, for example, when the driver is painting fingernails, applying makeup or shaving or the like, when the driver is nose picking, when the driver has climbed to the back seat, when the driver leans out of the window or sunroof, when the driver is smoking, when the driver has covered his or her eyes with anything.

Optionally, instead of using a look up table, there may be an artificial intelligence (AI) algorithm, such as, for example, a reward feedback learning type AI, implemented in the system that is substantially continuously watching the detectable or accessible driver health and activity parameters that are suitable to assess whether the driver is able to take over (recover). Especially when the driver is using the vehicle frequently, the system may continuously improve the assessment of the driver's health, activity and distraction parameters and the associated time it predicts the driver needs to take over control of the vehicle and the time it really takes the driver to take over control of the vehicle. Optionally, the AI algorithm may have the ability to also assimilate the learning input of other equipped vehicle fleet members via V2V or V2X for continuously improving the driver recovery time estimation.

Figure 5:
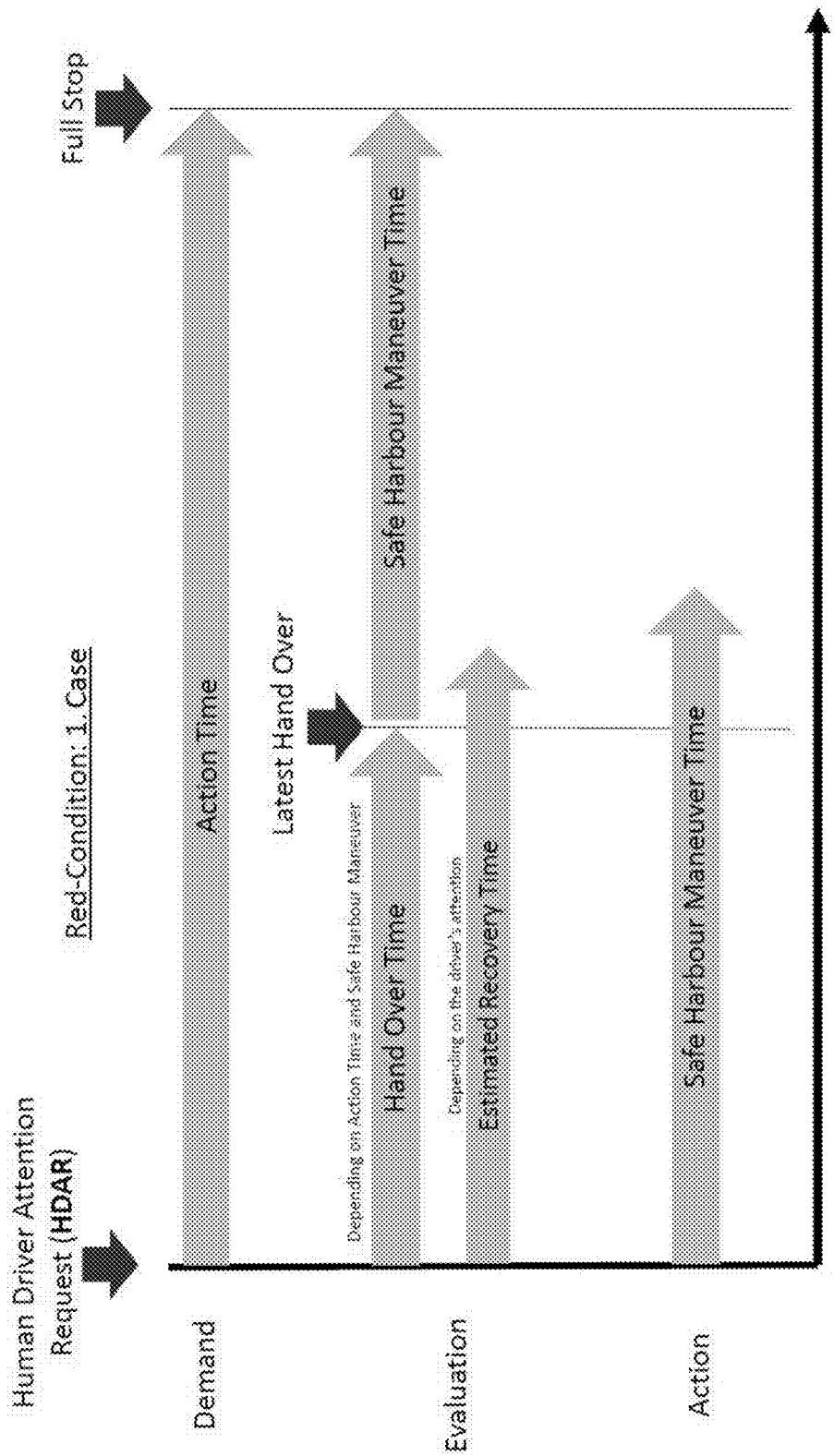
FIGS. 5, 6 and 7 are the same time schemes as FIGS. 2, 3 and 4, respectively, with the exception that the system's redundancy has been lost since a specific required autonomous driving system component or device is defective or has failed.
Figure 6:
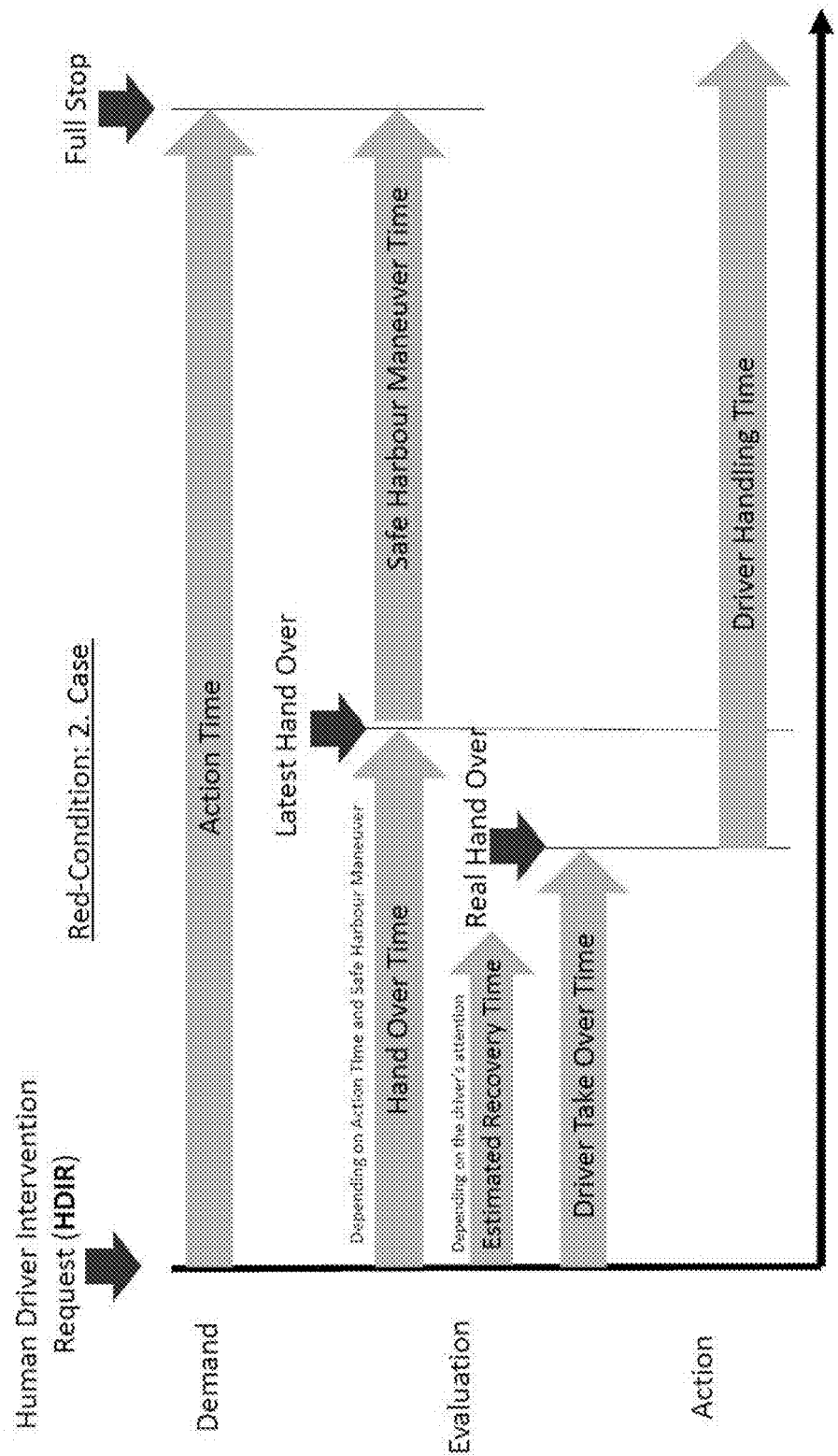
Figure 7:
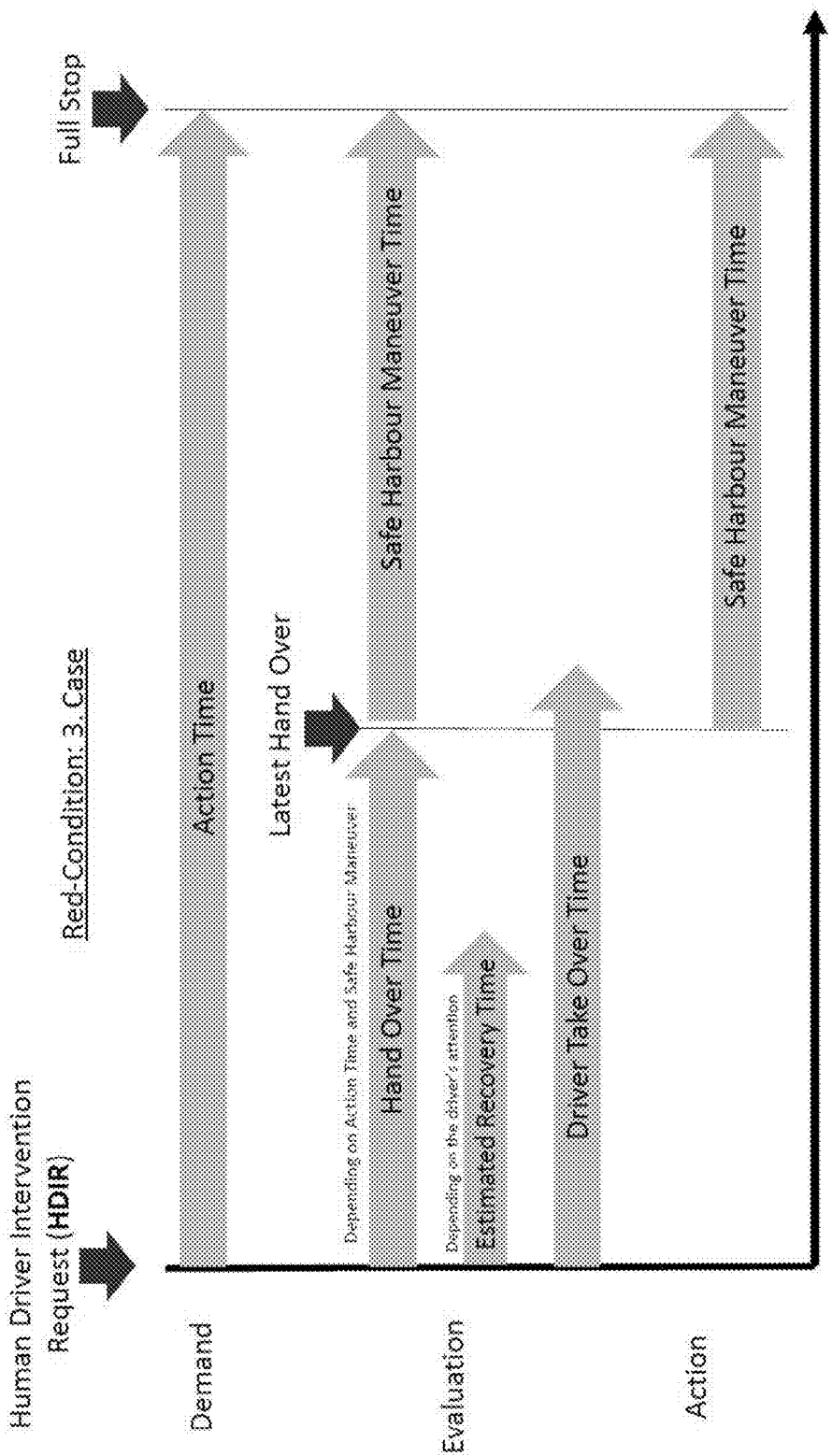

As an additional inventive aspect of the system of the present invention, the system may have according environmental sensors and an environmental scene detection processing algorithms as referred above. Optionally, the system may have a v2x and/or v2v connection for receiving additional scene map and hazardous object (HO) data and data to calibrate the SV ego position. Once the HO is known, the system of the invention may be able to predict evasive paths and necessary braking maneuvers, may be able to predict the time the maneuver will take and may assess whether it is necessary to put the control back to the driver as redundant handler for dynamic situations. Because the system continuously assesses or estimates the driver recovery time (EDRT), the system can calculate the threshold whether the EDRT is shorter or longer than the shortest time interval (Planned Handling Time or PHT) that is predicted that a human driver would need to properly control the vehicle in a safe manner in face of an upcoming event. The upcoming event may be to stop (see FIGS. 5, 6, and 7) in time before hitting a hazardous object or may be something comparably harmless such as for the driver to recover vehicle control when taking a highway off ramp. The remaining hand over time (HOT)

is the result of subtracting the PHT from the total remaining time (Action time). The Driver Take Over Time (DTOT) is the time it really takes until the driver takes over.

In accordance with the system of the present invention, in case the estimated driver recovery time or EDRT is longer than the hand over time or HOT (see case shown in FIG. 2), the vehicle will initiate a safe harbor maneuver SHM immediately, since there will be a timeframe at which no driver redundancy is given (predictively). Since redundancy is required, the SHM is the safest remaining option.

A SHM is any maneuver which brings the vehicle to the relatively safest stopping point. The path may be drafted by the above discussed environmental scene detection processing algorithms and paths planners. The path plan may involve lane changes. On right hand traffic highways or Autobahns, the planner may substantially plan to change subsequently to the righter lanes and then change to the shoulder or break down lane to stop. Optionally, it may be assessed that the safest stopping point is a highway or Autobahn parking lot ('Autobahnparkplatz') in near distance. In that case the system may change to the right lane until reaching the lane leading to the parking lot and may park at the parking lot (optionally utilizing an automated parking system's procedure). Optionally, the system may assess or determine that the safest stopping point is a parking bay in near distance. In that case the system may change to the right lane until reaching the parking bay and may stop there.

In all cases where the EDRT is shorter than the HOT, the vehicle will allow the driver to take back drive control prior to the planned handling maneuver becoming necessary (at the end of the (real) driver take over time or DTOT) (see case shown in FIG. 3). In cases where it turns out the driver did not take over the control within the ERT (see case shown in FIG. 4), whether because the recovery time estimation was wrong or the driver just refused to take over in time, the vehicle initiates a safe harbor maneuver or SHM (at the latest handover time (LHO). Depending on the type of event (Event on the Event Point—Event Point is the point of time at which the event occurs or when or where the vehicle will encounter the event, such as a system failure or the control's loss of ability to control the vehicle in the autonomous or semi-autonomous mode or a hazardous condition or object ahead of the vehicle and in the path of travel of the vehicle), the driver may or may not be allowed to take back the vehicle control after when the SHM was already triggered and partially executed. Some events demand severe maneuvers which may be adversely effected or messed up when a human driver interferes since he or she does not fully understand it in time or is not able to execute the maneuver. In some cases the vehicle may execute vehicle controls that are typically not an option to a human driver, such as putting different torque to different wheels such as vehicle control systems with environmental scene detection and invasive path planning may do. Such systems are described in U.S. Publication No. US-2017-0144658, which is hereby incorporated herein by reference in its entirety.

As discussed above, the driver is required as being the 'fall back' redundancy when an autonomous driving system component is failing. In accordance with another aspect of the invention, the system may request the driver to take back control (recover) via HDIR in case an autonomous driving system component is detected as failing. Failing of an essential autonomous driving system component means the required redundancy is abruptly lost (see cases shown in FIGS. 5, 6 and 7). There may be urgent cases at which it is tasked to prevent an emergency situation, such as, for example, the scene detection may be limited due to, for example, a defect of the front RADAR. In these cases, the system may request to hand over the driving task to the driver as soon as possible, optionally initiating a safe harbor maneuver or SHM simultaneously (see case shown in FIG. 5). On the other hand there may be less urgent cases (see cases shown in FIGS. 6 and 7) of autonomous driving system component failings or faults, such as, for example, a defective front head light (Xenon light bulb, or LED or the like) during day time and bright whether condition. In these less urgent cases, the vehicle may inform the driver about the defect and may trigger a HDIR but may not trigger a SHM immediately but may reflect the estimated DRT. As a first option the system may stay in the automated driving mode, ignoring the less severe defect of an autonomous driving system component, such as upon a quitting of the defect message by the driver. Nevertheless, in these less urgent cases the vehicle may be able to continue the automated driving task for a long time without trouble, and the system may hand over the driving task to the human anyway since it cannot predict where or when the defective system component may become essential to continue driving. While driving in, for example, a tunnel entrance is very well predictable, other conditions, such as, for example, a heavy rain shower setting in, is not very well predictable. As a second option, past the DRT the system may engage an SHM automatically, which may be interruptible by the driver taking over control of the vehicle. Optionally, as soon the driver has taken over driving control once, the system may refuse to get (re-)engaged into automated driving mode according SAE Level 3 again, since the redundancy criteria is not given when an autonomous driving system component is defective or failing.

Optionally, once an autonomous driving system component is determined to be defective or failed, the system may provide driver attended autonomous driving mode in accordance with SAE Level 2 as a more comfortable mode than the driver just driving by himself or herself or in a mode according SAE Level 1. Optionally, when an autonomous driving system component is determined to be defective or failed, the system may provide a lane and/or ACC assist mode in accordance with SAE Level 1 as a more comfortable mode than the driver just driving by himself/herself. Optionally, both modes may be offered to the driver to engage in accordance with the remaining functioning sensors, devices and processing systems, staying on the safe side during providing the highest comfort always.

Thus, the present invention provides a control system for a vehicle that is operable to control the vehicle in an autonomous or semi-autonomous mode, and that is operable to either stop the vehicle or hand over control of the vehicle to an occupant (which then becomes the driver) of the vehicle when the system determines that the vehicle is approaching an event or event point at which the control should not be operating in the autonomous or semi-autonomous mode. The event may comprise a hazardous driving condition (such as a hazardous road condition or such as an object or obstacle) ahead of the vehicle or an imminent failure in said control system that may affect said control system's ability to control the vehicle in the autonomous or semi-autonomous mode.

When the control system is operating in the autonomous or semi-autonomous mode and responsive to a determination of the upcoming event that requires the system to hand over control of the vehicle to a driver of the vehicle before the vehicle encounters the event, the control determines (i) a total action time until the vehicle encounters the event, (ii)

an estimated time for the driver to take over control of the vehicle and (iii) an estimated handling time for the vehicle to be controlled before the vehicle encounters the event. Responsive to the determined total action time, estimated driver take over time and estimated handling time, the control system either (i) allows the driver to take over control of the vehicle or (ii) controls the vehicle to slow down and stop the vehicle before the vehicle encounters the event. Responsive to the estimated driver takeover time being greater than the difference between the total action time and the estimated handling time, the control system controls the vehicle to slow down and stop the vehicle. Responsive to the estimated driver takeover time being less than the difference between the total action time and the estimated handling time, the control system allows the driver to take over control of the vehicle, and responsive to the control allowing the driver to take over control of the vehicle but when the driver fails to take over control of the vehicle by the difference between the total action time and the estimated handling time, the control system controls the vehicle to slow down and stop the vehicle.

The vehicle may include any type of sensor or sensors, such as imaging sensors or radar sensors or lidar sensors or ladar sensors or ultrasonic sensors or the like. The cameras or sensors at the vehicle may comprise any suitable camera or sensor. The system includes an image processor operable to process image data captured by the camera or cameras, such as for detecting objects or other vehicles or pedestrians or the like in the field of view of one or more of the cameras. For example, the image processor may comprise an image processing chip selected from the EyeQ family of image processing chips available from Mobileye Vision Technologies Ltd. of Jerusalem, Israel, and may include object detection software (such as the types described in U.S. Pat. Nos. 7,855,755; 7,720,580 and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

For example, the vision system and/or processing and/or camera and/or circuitry may utilize aspects described in U.S. Pat. Nos. 9,233,641; 9,146,898; 9,174,574; 9,090,234; 9,077,098; 8,818,042; 8,886,401; 9,077,962; 9,068,390; 9,140,789; 9,092,986; 9,205,776; 8,917,169; 8,694,224; 7,005,974; 5,760,962; 5,877,897; 5,796,094; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 6,636,258; 7,145,519; 7,161,616; 7,230,640; 7,248,283; 7,295,229; 7,301,466; 7,592,928; 7,881,496; 7,720,580; 7,038,577; 6,882,287; 5,929,786 and/or 5,786,772, and/or U.S. Publication Nos. US-2014-0340510; US-2014-0313339; US-2014-0347486; US-2014-0320658; US-2014-0336876; US-2014-0307095; US-2014-0327774; US-2014-0327772; US-2014-0320636; US-2014-0293057; US-2014-0309884; US-2014-0226012; US-2014-0293042; US-2014-0218535; US-2014-0218535; US-2014-0247354; US-2014-0247355; US-2014-0247352; US-2014-0232869; US-2014-0211009; US-2014-0160276; US-2014-0168437; US-2014-0168415; US-2014-0160291; US-2014-0152825; US-2014-0139676; US-2014-0138140; US-2014-0104426; US-2014-0098229; US-2014-0085472; US-2014-0067206; US-2014-0049646; US-2014-0052340; US-2014-0025240; US-2014-0028852; US-2014-005907; US-2013-0314503; US-2013-0298866; US-2013-0222593; US-2013-0300869; US-2013-0278769; US-2013-0258077; US-2013-0258077; US-2013-0242099; US-2013-0215271; US-2013-0141578 and/or US-2013-0002873, which are all hereby incorporated herein by reference in their entireties. The system may communicate with other communication systems via any suitable means, such as by utilizing aspects of the systems described in International Publication Nos. WO 2010/144900; WO 2013/043661 and/or WO 2013/081985, and/or U.S. Pat. No. 9,126,525, which are hereby incorporated herein by reference in their entireties.

The system may also communicate with other systems, such as via a vehicle-to-vehicle communication system or a vehicle-to-infrastructure communication system or the like. Such car2car or vehicle to vehicle (V2V) and vehicle-to-infrastructure (car2X or V2X or V2I or 4G or 5G) technology provides for communication between vehicles and/or infrastructure based on information provided by one or more vehicles and/or information provided by a remote server or the like. Such vehicle communication systems may utilize aspects of the systems described in U.S. Pat. Nos. 6,690,268; 6,693,517 and/or 7,580,795, and/or U.S. Publication Nos. US-2014-0375476; US-2014-0218529; US-2013-0222592; US-2012-0218412; US-2012-0062743; US-2015-0251599; US-2015-0158499; US-2015-0124096; US-2015-0352953; US-2016-0036917 and/or US-2016-0210853, which are hereby incorporated herein by reference in their entireties.

The system may utilize aspects of head and face direction and position tracking systems and/or eye tracking systems and/or gesture recognition systems (such as to determine the driver attentiveness or the like). Such head and face direction and/or position tracking systems and/or eye tracking systems and/or gesture recognition systems may utilize aspects of the systems described in U.S. Publication Nos. US-2016-0137126; US-2015-0352953; US-2015-0296135; US-2015-0294169; US-2015-0232030; US-2015-0022664; US-2015-0015710; US-2015-0009010 and/or US-2014-0336878, which are hereby incorporated herein by reference in their entireties.

The system may utilize sensors, such as radar or lidar sensors or the like. The sensing system may utilize aspects of the systems described in U.S. Pat. Nos. 9,753,121; 9,689,967; 9,599,702; 9,575,160; 9,146,898; 9,036,026; 8,027,029; 8,013,780; 6,825,455; 7,053,357; 7,408,627; 7,405,812; 7,379,163; 7,379,100; 7,375,803; 7,352,454; 7,340,077; 7,321,111; 7,310,431; 7,283,213; 7,212,663; 7,203,356; 7,176,438; 7,157,685; 6,919,549; 6,906,793; 6,876,775; 6,710,770; 6,690,354; 6,678,039; 6,674,895 and/or 6,587,186, and/or International Publication No. WO 2011/090484 and/or U.S. Publication Nos. US-2017-0254873; US-2017-0222311 and/or US-2010-0245066, and/or U.S. patent application Ser. No. 15/675,919, filed Aug. 14, 2017, and published on Feb. 15, 2018 as U.S. Patent Publication No. US-2018-0045812, Ser. No. 15/647,339, filed Jul. 12, 2017, now U.S. Pat. No. 10,239,446, Ser. No. 15/619,627, filed Jun. 12, 2017, and published on Dec. 14, 2017 as U.S. Patent Publication No. US-2017-0356994, Ser. No. 15/584,265, filed May 2, 2017, and published on Nov. 2, 2017 as U.S. Patent Publication No. US-2017-0315231, and/or Ser. No. 15/467,247, filed Mar. 23, 2017, and published on Sep. 28, 2017 as U.S. Patent Publication No. US-2017-0276788, and/or International PCT Application No. PCT/IB2017/054120, filed Jul. 7, 2017, and published on Jan. 11, 2018 as International PCT Publication No. WO 2018/007995, which are hereby incorporated herein by reference in their entireties.

Optionally, the vision system may include a display for displaying images captured by one or more of the imaging sensors for viewing by the driver of the vehicle while the driver is normally operating the vehicle. Optionally, for example, the vision system may include a video display device, such as by utilizing aspects of the video display systems described in U.S. Pat. Nos. 5,530,240; 6,329,925; 7,855,755; 7,626,749; 7,581,859; 7,446,650; 7,338,177; 7,274,501; 7,255,451; 7,195,381; 7,184,190; 5,668,663; 5,724,187; 6,690,268; 7,370,983; 7,329,013; 7,308,341; 7,289,037; 7,249,860; 7,004,593; 4,546,551; 5,699,044; 4,953,305; 5,576,687; 5,632,092; 5,677,851; 5,708,410; 5,737,226; 5,802,727; 5,878,370; 6,087,953; 6,173,508; 6,222,460; 6,513,252 and/or 6,642,851, and/or U.S. Publication Nos. US-2012-0162427; US-2006-0050018 and/or US-2006-0061008, which are all hereby incorporated herein by reference in their entireties. Optionally, the vision system (utilizing the forward facing camera and a rearward facing camera and other cameras disposed at the vehicle with exterior fields of view) may be part of or may provide a display of a top-down view or birds-eye view system of the vehicle or a surround view at the vehicle, such as by utilizing aspects of the vision systems described in International Publication Nos. WO 2010/099416; WO 2011/028686; WO 2012/075250; WO 2013/019795; WO 2012/075250; WO 2012/145822; WO 2013/081985; WO 2013/086249 and/or WO 2013/109869, and/or U.S. Publication No. US-2012-0162427, which are hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A vehicle control system for a vehicle that is operable to control the vehicle in an autonomous or semi-autonomous mode, said vehicle control system comprising:
    a plurality of sensors disposed at the vehicle and having fields of sensing exterior of the vehicle;
    a processor operable to process data captured by said sensors;
    wherein, when said vehicle control system is operating in the autonomous or semi-autonomous mode and responsive to a determination of a triggering event that requires the vehicle control system to hand over control of the vehicle to a driver of the vehicle before the vehicle encounters an event point, said vehicle control system determines (i) a total action time until the vehicle encounters the event point, (ii) an estimated time for the driver to take over control of the vehicle and (iii) an estimated handling time for the vehicle to be controlled before the vehicle encounters the event point; and
    wherein, responsive to the determined total action time, estimated driver take over time and estimated handling time, said vehicle control system one of (i) allows the driver to take over control of the vehicle and (ii) controls the vehicle to slow down and stop the vehicle before the event point.

2. The vehicle control system of claim 1, wherein, responsive to the estimated driver takeover time being greater than the difference between the total action time and the estimated handling time, said vehicle control system controls the vehicle to slow down and stop the vehicle.

3. The vehicle control system of claim 2, wherein a location where the vehicle is slowing down and stopping at is an emergency stopping lane or a shoulder of a road the vehicle is travelling along.

4. The vehicle control system of claim 2, wherein a location where the vehicle is slowing down and stopping at is a parking bay or parking lot.

5. The vehicle control system of claim 1, wherein, responsive to the estimated driver takeover time being less than the difference between the total action time and the estimated handling time, said vehicle control system allows the driver to take over control of the vehicle.

6. The vehicle control system of claim 5, wherein, responsive to the driver not taking over control of the vehicle by the difference between the total action time and the estimated handling time, said vehicle control system controls the vehicle to slow down and stop the vehicle.

7. The vehicle control system of claim 6, wherein a location where the vehicle is slowing down and stopping at is an emergency stopping lane or a shoulder of a road the vehicle is travelling along.

8. The vehicle control system of claim 6, wherein a location where the vehicle is slowing down and stopping at is a parking bay or parking lot.

9. The vehicle control system of claim 1, wherein the event point comprises an event that cannot be handled by said vehicle control system when said vehicle control system is operating in the autonomous or semi-autonomous mode.

10. The vehicle control system of claim 1, wherein the triggering event comprises detection of an object ahead of the vehicle and in a current path of travel of the vehicle, and wherein the event point comprises the detected object.

11. The vehicle control system of claim 1, wherein the triggering event is a determination of a hazardous driving condition ahead of the vehicle, and wherein the event point is a location of the determined hazardous driving condition.

12. The vehicle control system of claim 1, wherein the triggering event is a determination of an error in said vehicle control system that may affect said control system's ability to control the vehicle in the autonomous or semi-autonomous mode, and the event point is a time or location by which the vehicle should be stopped.

13. A vehicle control system for a vehicle that is operable to control the vehicle in an autonomous or semi-autonomous mode, said vehicle control system comprising:
    a plurality of sensors disposed at the vehicle and having fields of sensing exterior of the vehicle, wherein said plurality of sensors comprises a plurality of cameras disposed at the vehicle and a plurality of radar sensors disposed at the vehicle;
    a processor operable to process data captured by said sensors;
    wherein said vehicle control system determines an upcoming event that cannot be handled by said vehicle control system when said vehicle control system is operating in the autonomous or semi-autonomous mode;
    wherein, when said vehicle control system is operating in the autonomous or semi-autonomous mode and responsive to a determination of the upcoming event that requires the vehicle control system to hand over control of the vehicle to a driver of the vehicle before the vehicle encounters the event, said control determines (i) a total action time until the vehicle encounters the event, (ii) an estimated time for the driver to take over control of the vehicle and (iii) an estimated handling time for the vehicle to be controlled before the vehicle encounters the event; and wherein, responsive to the determined total action time, estimated driver take over time and estimated handling time, said vehicle control system one of (i) allows the driver to take over control of the vehicle and (ii) controls the vehicle to slow down and stop the vehicle before the vehicle encounters the event.

14. The vehicle control system of claim 13, wherein, responsive to the estimated driver takeover time being greater than the difference between the total action time and the estimated handling time, said vehicle control system controls the vehicle to slow down and stop the vehicle.

15. The vehicle control system of claim 13, wherein, responsive to the estimated driver takeover time being less than the difference between the total action time and the estimated handling time, said vehicle control system allows the driver to take over control of the vehicle.

16. The vehicle control system of claim 15, wherein, responsive to the driver not taking over control of the vehicle by the difference between the total action time and the estimated handling time, said vehicle control system controls the vehicle to slow down and stop the vehicle.

17. The vehicle control system of claim 13, wherein the event comprises a hazardous driving condition ahead of the vehicle.

18. The vehicle control system of claim 13, wherein the event comprises an imminent failure in said vehicle control system that may affect said control system's ability to control the vehicle in the autonomous or semi-autonomous mode.

19. A vehicle control system for a vehicle that is operable to control the vehicle in an autonomous or semi-autonomous mode, said vehicle control system comprising:

a plurality of sensors disposed at the vehicle and having fields of sensing exterior of the vehicle, wherein said plurality of sensors comprises a plurality of cameras disposed at the vehicle and a plurality of radar sensors disposed at the vehicle;

a processor operable to process data captured by said sensors;

wherein said vehicle control system determines an upcoming event that cannot be handled by said vehicle control system when said vehicle control system is operating in the autonomous or semi-autonomous mode;

wherein, when said vehicle control system is operating in the autonomous or semi-autonomous mode and responsive to a determination of the upcoming event that requires the vehicle control system to hand over control of the vehicle to a driver of the vehicle before the vehicle encounters the event, said control determines (i) a total action time until the vehicle encounters the event, (ii) an estimated time for the driver to take over control of the vehicle and (iii) an estimated handling time for the vehicle to be controlled before the vehicle encounters the event;

wherein, responsive to the determined total action time, estimated driver take over time and estimated handling time, said vehicle control system one of (i) allows the driver to take over control of the vehicle and (ii) controls the vehicle to slow down and stop the vehicle before the vehicle encounters the event;

wherein, responsive to the estimated driver takeover time being greater than the difference between the total action time and the estimated handling time, said vehicle control system controls the vehicle to slow down and stop the vehicle;

wherein, responsive to the estimated driver takeover time being less than the difference between the total action time and the estimated handling time, said vehicle control system allows the driver to take over control of the vehicle; and wherein, responsive to said control allowing the driver to take over control of the vehicle and responsive to the driver not taking over control of the vehicle by the difference between the total action time and the estimated handling time, said vehicle control system controls the vehicle to slow down and stop the vehicle.

20. The vehicle control system of claim 19, wherein the event comprises one of (i) a hazardous driving condition ahead of the vehicle and (ii) an imminent failure in said vehicle control system that may affect said control system's ability to control the vehicle in the autonomous or semi-autonomous mode.

* * * * *